United States Patent Office 3,257,413
Patented June 21, 1966

3,257,413
TRICARBOCYCLIC DERIVATIVES OF
p-AMINOALKOXYBENZHYDROL
James Harold Short, Lake Forest, Ill., assignor to Abbott Laboratories, North Chicago, Ill., a corporation of Illinois
No Drawing. Filed June 24, 1963, Ser. No. 290,201
5 Claims. (Cl. 260—326.5)

This invention relates to new compounds of the formula $$\text{Ph}-\underset{\underset{OH}{|}}{\overset{R}{\underset{|}{C}}}-\text{Ph}-O-(CH_2)_n-R^1 \qquad I$$

and a method for their preparation. In this and succeeding formulas, R is a fused tricarbocyclic radical such as phenanthryl, acenaphthenyl, acenaphthylenyl, anthryl or fluorenyl, n is an integer from 2 to 6 and $R^1$ is diloweralkylamino (dimethylamino thru dibutylamino), piperidino, morpholino or pyrrolidino. These compounds are very effective cholesterol lowering agents. In a representative operation, when a dose of 5 mg./kg. per day of the compound wherein R in the above formula is acenaphthenyl, n is 2 and $R^1$ is diethylamino was incorporated into the diet of mice, there was a 50% decrease in the cholesterol content of the blood after a period of two weeks in the treated mice compared to the control group which was not so treated.

The new compounds can be prepared by refluxing equimolar proportions of a Grignard reagent of the formula $$R^1-(CH_2)_n-O-\text{Ph}-MgBr \qquad II$$

and a compound of the formula $$R-\underset{\underset{O}{\|}}{C}-\text{Ph} \qquad III$$

in an inert, organic solvent such as tetrahydrofuran or ether. The reaction mixture is then cooled and hydrolyzed with a saturated, aqueous ammonium chloride solution. After filtering, the solvent is removed and the residue extracted and crystallized from a suitable solvent such as petroleum ether to obtain the desired product as a crystalline solid.

The examples which follow are merely illustrative and are not to be construed as limiting the invention to the exact proportions or procedures employed therein.

EXAMPLE 1

R=acenaphthenyl; n=2; $R^1$=diethylamino in Formula I

A solution of 18 g. (0.06 mole) of 4-bromophenyldiethylaminoethyl ether in 50 ml. of dry tetrahydrofuran and 1.6 g. (0.06 mole) of magnesium turnings was heated under reflux for 4 hours. After cooling to room temperature, 13 g. (0.05 mole) of 5-benzoylacenaphthene in 50 ml. of dry tetrahydrofuran was added and the resulting mixture heated under reflux for one hour. The reaction mixture was then cooled in an ice bath and hydrolyzed by dropwise addition of 20 ml. of a saturated, aqueous ammonium chloride solution. After drying with magnesium sulfate, the mixture was filtered and the solvent removed. The oily residue was extracted twice with 100 ml. portions of petroleum ether (B.P.=60°–80° C.) and after recrystallization from the same solvent the desired product was obtained as a white, crystalline solid melting at 96°–98° C. which upon analysis was found to contain 82.46% carbon, 7.46% hydrogen and 3.11% nitrogen compared to the calculated values of 82.48% carbon, 7.31% hydrogen and 3.10% nitrogen.

EXAMPLE 2

R=phenanthryl; n=2; $R^1$=diethylamino in Formula I

By substituting 9-benzoylphenanthrene for the 5-benzoylacenaphthene of Example 1, there is readily obtained the corresponding 9-phenanthryl product as a crystalline solid which melts at 158°–159° C. and analyzes 83.44% carbon, 7.33% hydrogen and 2.93% nitrogen compared to the theoretical values of 83.37% carbon, 6.95% hydrogen and 2.95% nitrogen.

EXAMPLE 3

R=fluorenyl; n=4; $R^1$=dimethylamino in Formula I

This compound is prepared by the reaction of 4-bromophenyldimethylaminobutyl ether with magnesium and the subsequent addition thereto of 9-benzoylfluorene in the same manner as that described in Example 1. The compound has a molecular weight of 447.

EXAMPLE 4

R=anthryl; n=6; $R^1$=pyrrolidino in Formula I

By reacting 4-bromophenylpyrrolidinohexyl ether and 9-benzoylanthracene in the same manner as that described in Example 1, the corresponding anthryl derivative is obtained which has a molecular weight of 513.

Similarly, other compounds considered to be within the scope of the present invention can be prepared by refluxing an appropriate Grignard reagent of Formula II with an R-substituted benzoyl compound of Formula III.

The ether compounds employed as starting materials in this invention can be prepared by the reaction of p-bromophenol and an $R^1—(CH_2)_n—X$ compound wherein X is a halide (preferably chlorine). The reaction is carried out in an inert organic solvent such as benzene and in the presence of an acid acceptor such as potassium carbonate. After refluxing several hours, the reaction mixture is filtered and the filtrate fractionally distilled to obtain the desired ether which is then reacted with magnesium to form the corresponding Grignard reagent. Thus, the reaction of p-bromophenol and diethylaminoethyl chloride results in the formation of 4-bromophenyldiethylaminoethyl ether which boils at 120°–125° C. at 0.6 mm. and has a refractive index of $n_D^{25}$ of 1.5280.

The R-substituted benzoyl compounds of Formula III are known or can be prepared by the reaction of a benzoyl halide with phenanthrene, acenaphthene, acenaphthylene, anthracene or fluorene in nitrobenzene and in the presence of aluminum chloride at from 0° C. to room temperature. The reaction mixture is then hydrolyzed and distilled to obtain the desired benzoyl derivative which can be recrystallized from an organic solvent such as acetic acid. Thus, 5-benzoylacenaphthene melts at 100° C. whereas 9-benzoylphenanthrene melts at 127° C.

What I claim is:

1. A compound of the formula $$\text{Ph}-\underset{\underset{OH}{|}}{\overset{R}{\underset{|}{C}}}-\text{Ph}-O-(CH_2)_n-R^1 \qquad I$$

wherein R is a radical selected from the group consisting of phenanthryl, acenaphthenyl, acenaphthylenyl, anthryl and fluorenyl, n is an integer from 2 to 6 inclusive and $R^1$ is selected from the group consisting of diloweralkylamino, piperidino, morpholino and pyrrolidino.

2. A compound as claimed in claim 1 in which R is acenaphthenyl, $n$ is 2 and $R^1$ is diethylamino.

3. A compound as claimed in claim 1 in which R is phenanthryl, $n$ is 2 and $R^1$ is diethylamino.

4. A compound as claimed in claim 1 in which R is fluorenyl, $n$ is 4 and $R^1$ is dimethylamino.

5. A compound as claimed in claim 1 in which R is anthryl, $n$ is 6 and $R^1$ is pyrrolidino.

References Cited by the Examiner
UNITED STATES PATENTS
3,168,565   2/1965   Palopoli et al. _____ 260—570.7

OTHER REFERENCES
Cram and Hammond: Organic Chemistry, 1959, p. 220.

HENRY R. JILES, *Acting Primary Examiner.*

J. A. NARCAVAGE, *Assistant Examiner.*